United States Patent [19]

Kubo et al.

[11] 4,417,307

[45] Nov. 22, 1983

[54] AUTOMATIC TRANSMISSION WITH ELECTRICAL OVERRIDE

[75] Inventors: Seitoku Kubo; Yukio Terakura; Shinya Nakamura, all of Toyota; Ken Asami, Nagoya, all of Japan

[73] Assignee: Toyota Jidosha Kogyo Kabushiki Kaisha, Toyota, Japan

[21] Appl. No.: 169,637

[22] Filed: Jul. 17, 1980

[30] Foreign Application Priority Data

Aug. 21, 1979 [JP] Japan .................................. 54-106790

[51] Int. Cl.³ ..................... G05D 29/00; B60K 41/08; B60K 41/22
[52] U.S. Cl. .................................. 364/424.1; 74/866; 74/868
[58] Field of Search ............... 364/424.1; 74/740, 745, 74/752 D, 866, 867

[56] References Cited

U.S. PATENT DOCUMENTS

| 4,308,764 | 1/1982 | Kawamoto et al. | 74/866 X |
| 4,312,248 | 1/1982 | Sugimoto et al. | 74/866 X |
| 4,314,340 | 2/1982 | Miki et al. | 364/424.1 |
| 4,319,501 | 3/1982 | Sugimoto | 74/866 |

Primary Examiner—Felix D. Gruber
Attorney, Agent, or Firm—Birch, Stewart, Kolasch & Birch

[57] ABSTRACT

A fluid pressure control device for an automatic transmission of an automotive vehicle, wherein throttle pressure and governor pressure control valves produce a throttle pressure and a governor pressure from a line pressure, while several shift valves produce selectively, according to the balance of the throttle pressure and the governor pressure, pressures for actuating several friction engaging devices which provide several speed stages of the transmission. However, the shift valve which controls switching between the highest and the next to the highest speed stages is electrically controlled in its kick down throttle opening and high speed region, so that in this region the upshift and the downshift lines are both largely biased to the higher vehicle speed, depending upon a throttle opening sensor, a vehicle speed sensor, and an electrical computing device.

6 Claims, 12 Drawing Figures

AUTOMATIC TRANSMISSION WITH ELECTRICAL OVERRIDE

BACKGROUND OF THE INVENTION

The present invention relates to the field of control devices for automatic transmissions of automotive vehicles, and more particularly, relates to a transmission control device in which the characteristics of a conventional hydraulic fluid pressure control device are supplemented by an electrical override system.

There is a known form of automotive vehicle automatic transmission, comprising a fluid torque converter and a gear transmission mechanism equipped with a plurality of friction engaging means, the selective engagement of which provides various transmission speed stages. The selective engagement of these friction engagement means is, conventionally, automatically performed according to the operational condition of the vehicle in which the transmission is mounted, in order to control the gear transmission mechanism to be in a shift state which is most appropriate to the moment by moment operating conditions of the vehicle, by selective supply of hydraulic fluid control pressures provided by a hydraulic fluid pressure control device.

In such a hydraulic fluid pressure control device, there are conventionally mounted various shift valves which perform switching actions in dependence on a throttle hydraulic fluid pressure (throttle pressure) which is varied according to the amount an accelerator or throttle pedal of the vehicle is depressed, i.e., according to the amount of opening of the intake throttle of the internal combustion engine of the vehicle, and also in accordance with a governor hydraulic fluid pressure (governor pressure), which is varied according to the road speed of the vehicle. These shift valves select various shift stages for the gear transmission mechanism according to the relationship between this throttle pressure, or the amount the accelerator pedal of the vehicle is depressed, and the governor pressure, or the vehicle road speed.

However, the operational characteristics of such an automatic transmission are usually not entirely satisfactory. The functioning of the throttle hydraulic fluid pressure control valve which generates the throttle pressure is inevitably prone to a certain amount of hydraulic fluid leakage; and the same is true for the governor hydraulic fluid pressure control valve which generates the governor pressure. Further, since the line hydraulic fluid pressure (line pressure), which is a basic source of pressure which is controlled to produce the throttle pressure and the governor pressure, is inherently limited, due to the basic structure of the hydraulic fluid pressure control device, there exists a critical vehicle road speed, at road speeds over which the governor hydraulic fluid pressure valve, which typically modifies the line pressure to generate the governor pressure by using the balance between the centrifugal force on a valve member generated by the rotation of an output shaft of the automatic transmission and the governor pressure itself generated from the line hydraulic fluid pressure, can no longer generate a governor pressure which properly represents the road speed of the vehicle. Therefore, especially at the highest speed ranges of the automatic transmission, operating errors may become so large that they are troublesome, and, in the most extreme case, it may become impossible to provide good and satisfactory hydraulic fluid pressure control action.

SUMMARY OF THE INVENTION

From the above and other considerations, an object of the present invention is to provide a transmission control device for an automatic transmission of a vehicle which is capable of controlling the automatic transmission to be in its optimum operating condition, from the lowest through to the highest speed ranges of the vehicle, by supplementing a part of the function of a hydraulic fluid pressure control system by means of an electrical control system.

It is a further object of the present invention to provide such a transmission control device wherein, in particular, the transmission speed valve which provides the highest speed stage is at suitable times overridden by an electrical control system.

It is a further object of the present invention to provide such a transmission control system in which the operation of a transmission valve which controls engagement of overdrive ratio is selectively overridden.

According to the present invention, these and other objects are accomplished by, for an automatic transmission, for a vehicle comprising an intake throttle, comprising a gear transmission mechanism comprising a plurality of hydraulic fluid pressure operated friction engagement devices for shifting the transmission between several speed stages, an automatic transmission control device, comprising: a source for supplying hydraulic fluid at pressure; a line hydraulic fluid pressure control valve for producing a controlled line pressure from the pressure source; a throttle hydraulic fluid pressure control valve for producing a throttle pressure from the line pressure, according to the amount of opening of the intake throttle; a governor hydraulic fluid pressure control valve for producing a governor pressure from the line pressure, according to the speed of the vehicle; a means for selecting a required operating range of speeds for the automatic transmission, which is controlled manually; a plurality of shift valves for switching hydraulic fluid pressures which are supplied to the friction engagement devices according to the values of the throttle pressure and the governor pressure, the throttle pressure and the governor pressure functioning in opposition; a vehicle speed sensor for generating an electrical signal which is related to the vehicle speed; a throttle sensor for generating an electrical signal which is related to the opening amount of the intake throttle; an electrically operated override valve for controlling the selective supply of an override hydraulic fluid pressure to one of the shift valves in opposition to the governor pressure; and an electrical computing device for controlling the override valve according to the electric signals produced by the vehicle speed sensor and the throttle sensor.

As a particular aspect of the present invention, it is preferred that the one of the shift valves which is selectively supplied with the override hydraulic fluid pressure should be the one for switching between the highest and the next to the highest speed stages provided by the gear transmission mechanism, and that the override hydraulic fluid pressure, when supplied, should force this shift valve not to provide the highest speed stage.

Further, in order to perform the most appropriate control of the automatic transmission by the shift control device of the present invention, in the higher speed operational area of the vehicle, in a most preferred manner, it is preferred that the electrical computing device should control the electrically operated hydraulic fluid valve: (a) not to provide the override pressure when the opening amount of the intake throttle is below a predetermined critical throttle opening amount, irrespective of the vehicle speed; (b1) when the vehicle speed is within a certain range below a first predetermined vehicle speed value, and the opening amount of the intake throttle is then increased from below the critical throttle opening amount to above the critical throttle opening amount, the vehicle speed meanwhile remaining substantially constant, to commence supply of the override pressure; (b2) when the vehicle speed is above the first predetermined vehicle speed value, and the opening amount of the intake throttle is then increased from below the critical throttle opening amount to above the critical throttle opening amount, the vehicle speed meanwhile remaining substantially constant, not to commence supply of the override pressure; (c1) when, while the opening amount of the intake throttle remains above the critical throttle opening amount and the override pressure is being provided, the vehicle speed increases, to stop supply of the override pressure when the vehicle speed passes from below a second predetermined vehicle speed value, which is somewhat higher than the first predetermined vehicle speed value, to above this second predetermined vehicle speed value; and (c2) when, while the opening amount of the intake throttle remains above the critical throttle opening amount and the override pressure is not being provided, the vehicle speed decreases, to commence supply of the override pressure when the vehicle speed passes from above the first predetermined vehicle speed value to below this first predetermined vehicle speed value.

According to a further particular feature of the present invention, which is based upon the recognition of the fact that the override switching control of the highest speed shift valve by the electrically operated hydraulic fluid pressure valve is only required when the vehicle is running in its high speed operational area, and is not required when the vehicle is running in a lower speed operational area, it is preferred that the electrical calculating device further should control the electrically operated hydraulic fluid valve: (d) when the vehicle speed is below a third predetermined vehicle speed value substantially less than the first predetermined vehicle speed value; and the opening amount of the intake throttle is then increased from below the critical throttle opening amount to above the critical throttle opening amount, the vehicle speed meanwhile remaining substantially constant, not to commence supply of the override pressure; (e1) when, while the opening amount of the intake throttle remains above the critical throttle opening amount and supply of the override pressure is not being provided, the vehicle speed increases, to commence supply of the override pressure when the vehicle speed passes from below the third predetermined vehicle speed value to above this third predetermined vehicle speed value; and (e2) when, while the opening amount of the intake throttle remains above the critical throttle opening amount and supply of the override pressure is being provided, the vehicle speed decreases, to stop supply of the override pressure when the vehicle speed passes from above a fourth predetermined vehicle speed value which is somewhat lower than the third predetermined vehicle speed value, to below this fourth predetermined vehicle speed value.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
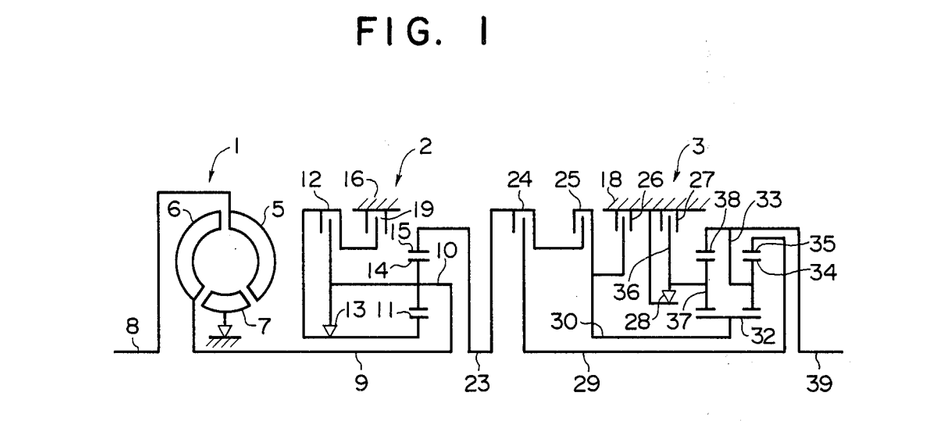
FIG. 1 is a schematic illustration showing the overall construction of a hydraulically controlled automatic transmission equipped with an overdrive device.

Referring to FIG. 1, an automatic transmission equipped with an overdrive device is herein shown in a diagrammatical form, for the purposes of simplicity. If, however, a more detailed description and explanation of the structure of this automatic transmission is required, reference should be made to the specification and to the drawings of U.S. Pat. No. 4,129,051, corresponding to Japanese patent application Ser. No. 51-159179, which explains this transmission in more detail, which has been published as Japanese Patent Laying Open Publication No. 53-81181, and which is assigned to the same assignee as is the present application.

Generally, the automatic transmission herein shown comprises a fluid torque converter 1, an overdrive unit 2, and a gear transmission mechanism 3, and provides three forward speed stages and one reverse speed stage. The engagement of the overdrive unit 2 and of the gear transmission mechanism 3 is performed by hydraulic fluid control pressures which are provided by a hydraulic fluid pressure control device, shown in FIG. 2, and described hereinafter.

In more detail, the fluid torque converter 1 is of a conventional well known type, and comprises a pump impeller 5, a turbine 6, and a stator 7. The pump impeller 5 is drivingly coupled to a power output shaft 8 of an internal combustion engine (not shown) of an automobile or other automotive vehicle, and the turbine 6 is drivingly connected to a turbine shaft 9, which constitutes a power output shaft of the fluid torque converter 1 and also a power input shaft for the overdrive unit 2, and is drivingly connected to a carrier 10 of a planetary gear mechanism incorporated in the overdrive unit 2.

The carrier 10 rotatably supports a plurality of planetary pinions 14, which are engaged with a sun gear 11 and a ring gear 15. A multi-disk clutch 12 and a one way clutch 13 are provided in parallel between the sun gear 11 and the carrier 10. Further, a multi-disk brake 19 is provided between the sun gear 11 and the casing 16 of the overdrive unit 2.

The ring gear 15 of the overdrive unit 2 is connected to a power input shaft 23 of the gear transmission mechanism 3. In the gear transmission mechanism 3, a multi disk clutch 24 is provided between the power input shaft 23 and an intermediate shaft 29, and further, a multi disk clutch 25 is provided between the power input shaft 23 and a sun gear shaft 30. A multi-disk brake 26 is provided between the sun gear shaft 30 and the casing 18 of the gear transmission mechanism 3. On the sun gear shaft 30 there is fixedly mounted a sun gear 32, which meshes with a plurality of planetary pinions 34, which are supported by a carrier 33, and which are meshed with a ring gear 35, so as to provide one planetary mechanism, while it also meshes with a plurality of planetary pinions 37, which are supported by a carrier 36, and which are meshed with a ring gear 38, so as to provide another planetary gear mechanism. The ring gear 35 of the one planetary gear mechanism is connected with the intermediate shaft 29, and, further, the carrier 33 of the same planetary gear mechanism is connected with the ring gear 38 of the other planetary gear mechanism. The carrier 33 and the ring gear 38 of the two planetary gear mechanisms are connected to a power output shaft 39 of the gear transmission mechanism 3. Further, a multi-disk brake 27 and a one way clutch 28 are provided in parallel between the carrier 36 of the other planetary gear mechanism and the casing 18 of the gear transmission mechanism 3.

Figure 2:
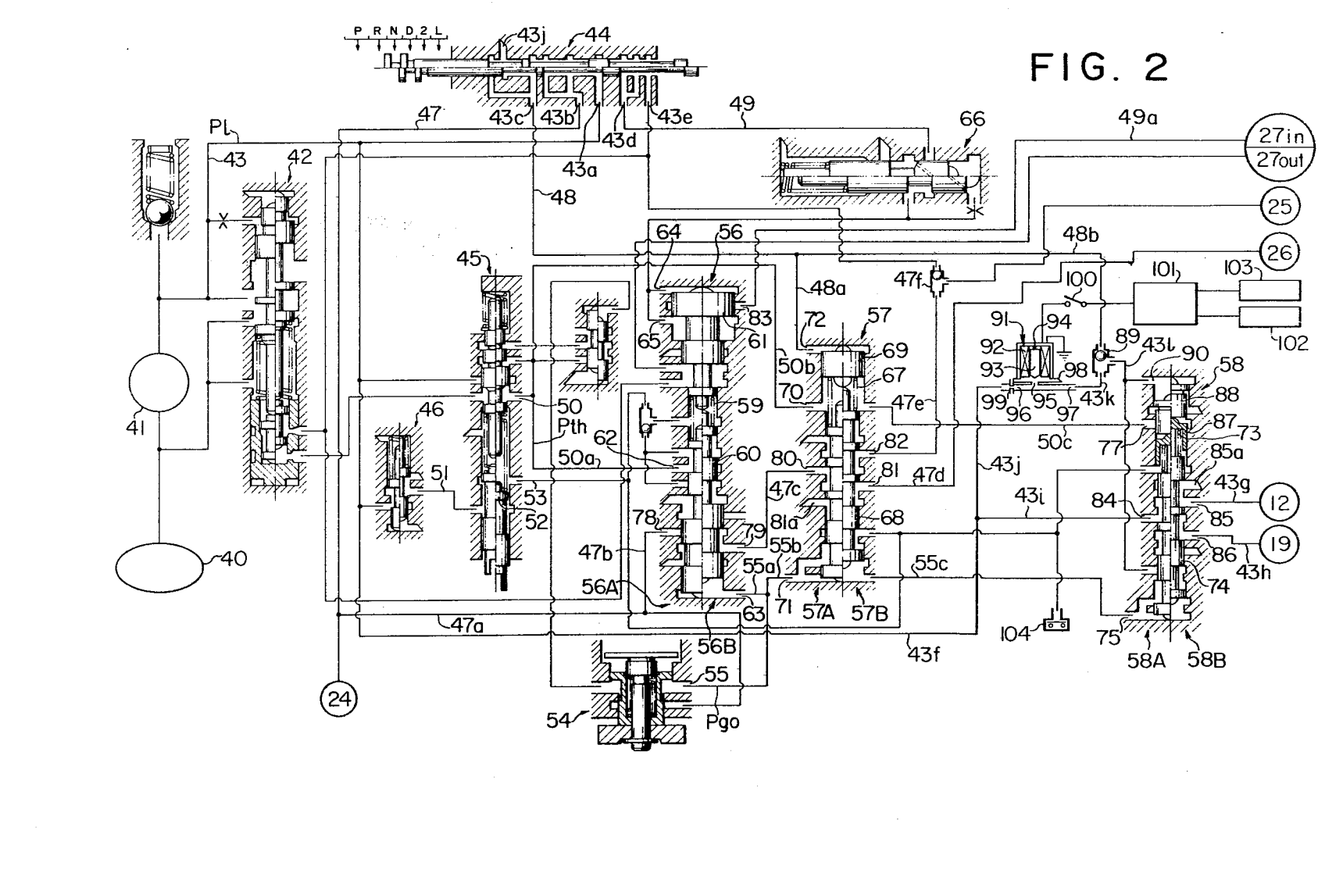
FIG. 2 is a diagrammatical illustration of the control system for the transmission diagrammatically shown in FIG. 1, comprising a hydraulic control system and an electrical control system.

This automatic transmission is controled by the hydraulic fluid pressure control device of FIG. 2 in such a manner that these aforementioned clutches and brakes are engaged or disengaged by selective supply of actuating hydraulic fluid pressure, so as to provide one of four forward speed gear stages including an overdrive gear stage, and one rearward gear stage, in accordance with the output power provided by the internal combustion engine, and in accordance with the speed of the vehicle.

In Table 1, the operating conditions of these various clutches and brakes, according to the various shift conditions, are shown.

TABLE 1

| Shifting means | 12 | 13 | 19 | 24 | 25 | 26 | 27 | 28 |
|---|---|---|---|---|---|---|---|---|
| FORWARD | | | | | | | | |
| D range | | | | | | | | |
| 1st. sp. | 0 | — | X | 0 | X | X | X | — |
| 2nd. sp. | 0 | — | X | 0 | X | 0 | X | X |
| 3rd. sp. | 0 | — | X | 0 | 0 | X | X | X |
| 4th. sp. (O/D) | X | X | 0 | 0 | 0 | X | X | X |
| 2 range | | | | | | | | |
| 1st. sp. | 0 | — | X | 0 | X | X | X | — |
| 2nd. sp. | 0 | — | X | 0 | X | 0 | X | X |
| L range | | | | | | | | |
| 1st. sp. | 0 | — | X | 0 | X | X | 0 | — |
| R range | | | | | | | | |
| REVERSE | 0 | — | X | X | 0 | X | 0 | X |

In this table, a "O" indicates engagement of a clutch or a brake, a "-" indicates engagement of a one way clutch when the internal combustion engine is producing output torque and driving the vehicle, and disengagement when the engine is not producing output torque, but is in the overrun condition; and a "X" indicates disengagement.

When the vehicle is driven with the manual shifting control set at "D" range, the automatic transmission is automatically shifted between the first, the second, the third, and the fourth or overdrive speed stages; when the vehicle is driven with the shifting control set at the "2" range, the automatic transmission is automatically shifted between the first and second speed stages; and, when the vehicle is driven with the shifting control set to the "L" range, the automatic transmission is fixed in its first speed stage, and no speed changing is possible.

FIG. 2 shows in diagrammatical form an embodiment of the hydraulic fluid pressure control device for the automatic transmission.

Hydraulic fluid is drawn up from a hydraulic fluid pan 40 by a hydraulic fluid pump 41, and is sent to a line hydraulic fluid pressure regulating valve 42, and is controlled to produce a controlled line hydraulic fluid pressure (line pressure) Pl in a passage 43. This line pressure is thence supplied to a manual shift valve 44, a throttle hydraulic fluid pressure control valve 45, and a detent hydraulic fluid pressure control valve 46. The manual shift valve 44 is manually controlled, via a linkage which is not shown, by the operator of the vehicle in which the transmission is installed, and has shifting positions which are parking (P), reverse (R), neutral (N), D range (D), 2 range (2), and L range (L). The line pressure, supplied through the passage 43 to an input port 43a of this manual shift valve 44, appears, according to the shift position selected by the driver of the vehicle, at the output ports 43b, 43c, 43d, and/or 43e, in combinations as shown and summarized in Table 2.

TABLE 2

| PORT | Shift condition | | | | | |
| --- | --- | --- | --- | --- | --- | --- |
|  | P | R | N | D | 2 | L |
| 43b |  |  |  | 0 | 0 | 0 |
| 43c |  |  |  |  | 0 | 0 |
| 43d | 0 | 0 |  |  |  | 0 |
| 43e |  | 0 |  |  |  |  |

The throttle hydraulic fluid pressure control valve 45 is supplied with the line pressure and generates a throttle hydraulic fluid pressure (throttle pressure) Pth at its output port 50 which increases as the throttle pedal of the vehicle is more depressed, i.e. as the throttle valve in the intake passage of the internal combustion engine is more opened.

The detent hydraulic fluid pressure control valve 46 is supplied with the line pressure Pl, and produces a detent hydraulic fluid pressure (detent pressure), lower than the line pressure Pl, in a passage 51, and supplies this detent pressure to various shift valves, which are explained hereinunder, via a kick down valve 52 incorporated in the throttle hydraulic fluid pressure control valve 45, and a passage 53, which is communicated with the passage 51, via the kick down valve 52, when the accelerator pedal of the vehicle is depressed by more than a specified amount, in order to retain these various shift valves at their shifted down positions. A passage 47 connected to the output port 43b of the manual shift valve 44 leads to the clutch 24 (forward clutch), and a passage 47a branched from a middle portion of the passage 47 leads to a governor hydraulic fluid pressure control valve 54. This governor hydraulic fluid pressure control valve 54 produces a governor hydraulic fluid pressure (governor pressure) Pgo at its output port 55, which varies according to the road speed of the vehicle.

A 1/2 speed shift valve 56, a 2/3 speed shift valve 57, and a 3/OD speed shift valve 58 are provided, for controlling, respectively, shifting of the automatic transmission between first and second speeds, between second and third speeds, and between third and overdrive speeds.

The 1/2 speed shift valve 56 comprises two valve members 60 and 61 arranged coaxially with a compression coil spring 59 interposed therebetween, in a valve chamber formed in a valve housing member. The valve member 60 may either assume its downwardly biased position, as viewed in FIG. 2 and as indicated by its axially left hand part 56A, or its upwardly biased position, also as viewed in FIG. 2 and as indicated by its axially right hand part 56B, depending upon the condition of balance between (a) a downward force, as viewed in FIG. 2, which is the sum of the force produced by the compression coil spring 59 and the force produced by the throttle pressure Pth, which is transmitted to its port 62 via a passage 50a, and (b) an upward force, as viewed in FIG. 2, generated by the governor pressure Pgo, which is transmitted to its port 63 at its lower end in the drawing, via a passage 55a. The valve member 61 is impelled by a downward force as viewed in FIG. 2 by the hydraulic fluid pressure which is generated from the line pressure which, when "L" range is selected on the manual shift valve 44, appears at the output port 43d of the manual shift valve 44 and is conducted through a passage 49 to a low modulator valve 66, so as to be modulated thereby and supplied to ports 64 and 65 of the 1/2 speed shift valve. When this downward force is applied to the valve member 61, below a certain road speed of the vehicle, the valve member 61 is biased downwards in the diagram, and thus constrains the valve member 60 to be in its lower biased position 56A.

Likewise, the 2/3 speed shift valve 57 comprises a lower, as viewed in the diagram, valve member 68 and an upper valve member 69, which are coaxial and which mutually oppose one another within the valve chamber of the valve 57 with a compression coil spring 67 being interposed between them. The lower valve member 68 may either assume a downwardly biased position as indicated by the axially left hand portion 57A thereof in the drawing, or may assume an upwardly biased position as indicated by the axially right hand portion 57B thereof in the drawing, depending on the condition of balance between (a) a downward force, which is the sum of the force produced by the compression coil spring 67 and the force produced by the throttle pressure Pth which is supplied to a port 70 through a passage 50b, and (b) an upward force, produced by the governor pressure Pgo, which is supplied to a port 71 through a passage 55b. The upper valve member 69 is actuated by the line pressure, which appears at the output port 43c of the manual shift valve 44, when this valve 44 is set by the driver of the vehicle at 2 range, and is conducted through passages 48 and 48a and a port 72, thereby forcibly constraining the lower valve member 68 to be in its downwardly biased position as viewed in the drawing, indicated by 57A.

Further, the 3/OD speed shift valve 58 comprises a lower valve member 74 and a middle valve member 87, which are coaxially disposed with a compression coil spring 73 interposed between them in the valve chamber of the valve 58. Further, coaxial with and above in the drawing to the middle valve member 87, there is provided an upper valve member 88. Thus the compression coil spring 73 exerts force downwards in the drawing on the lower valve member 74, while, on the other hand, said compression coil spring 73 exerts force upward in the drawing on the middle and upper valve members 87 and 88. The governor pressure Pgo is supplied to a port 75 through a passage 55c, so as to apply force upward in the diagram to the lower end of the lower valve member 74. Further, the middle valve member 87 is pushed downwards in the drawing by the throttle pressure Pth being supplied thereto through a passage 50c and a port 77, and, when this throttle pressure Pth exceeds a certain predetermined value large enough to overcome the restoring force of the compression coil spring 73, the middle valve member 87 is directly engaged with the lower valve member 74, with the compression coil spring 73 being compressed to its minimum extension, and thereby the middle valve member 87 directly imparts downward force to the lower valve member 74.

Therefore, when the upper valve member 88 is in its upward biased position as shown in the axially right hand part, in the drawing, of the speed shift valve 58, if the throttle pressure Pth which is supplied to the port 77 is below a certain predetermined pressure which is enough to compress the compression coil spring 73 to its minimum extension, then the lower valve member 74 may assume either its downwardly biased position indicated by 58A or its upwardly biased position indicated by 58B, in accordance with the actual road speed of the vehicle, depending on the condition of balance between the compression coil spring 73 and the governor pressure. On the other hand, when this upper valve member 88 is in its upwardly biased position in the drawing, if the throttle pressure supplied to the port 77 is increased, so that the compression coil spring 73 is compressed to its minimum extension so that the valve member 87 comes into direct contact with the valve member 74, then the valve member 74 is moved between its downwardly biased position indicated by 58A and its upwardly biased position indicated by 58B, depending now upon the condition of balance between the downward force exerted by the throttle pressure which acts on the middle valve member 87 via the port 77 and the passage 50c, and the upward force exerted by the governor pressure which is acting on the lower valve member 74 via the port 75.

When the manual shift valve 44 is set to the "D" range, the line pressure, supplied to the port 43a of the manual shift valve 44, is transmitted to the port 78 of the 1/2 speed shift valve 56 via the port 43b, passages 47 and 47a, and a passage 47b. This line pressure is, when the valve member 60 of the 1/2 speed shift valve 56 is in its upwardly biased position in the drawing indicated by 56B, also supplied to a port 80 of the 2/3 speed shift valve 57 via a passage 47c. When the valve member 68 of the 2/3 speed shift valve 57 is in its downwardly biased position in the drawing indicated by 57A, the line pressure, supplied to the port 80, is supplied to the second brake 26 from an output port 81 through a passage 47d. On the other hand, when the valve member 68 of the 2/3 speed shift valve 57 is in its upwardly biased position in the drawing indicated by 57B, the line pressure supplied to the port 80 is instead conducted to a port 82, wherefrom, via a passage 47e, and a shuttle valve 47f, it is supplied to the clutch 25 (reverse clutch).

When the manual shift valve 44 is shifted into the "L" range, the line pressure appearing at its output port 43d is supplied to the inside part of the brake 27, via the passage 49, the low modulator valve 66, the port 64 of the 1/2 speed shift valve 56, the port 83 of said valve 56, and the passage 49a.

In this connection, the outside part of the brake 27 is supplied with the pressure which appears at the output port 43e of the manual shift valve, when it is set to "R" range.

The port 84 of the 3/OD speed shift valve is supplied with the line pressure via the passage 43, the passage 43f, and the passage 43i. This line pressure, supplied to the input port 84, is transmitted to the clutch 12 of the overdrive unit 2 via a port 85 of the valve 58, and via a passage 43g, when the valve member 74 of the valve 58 is in its downwardly biased position indicated in the drawing by 58A, and, on the other hand, is supplied to the brake 19 of the overdrive unit 2, via a port 86 of the valve 58 and a passage 43h, when the valve member 74 of the valve 58 is in its upwardly biased position, indicated in the drawing by 58B.

When the manual shift valve 44 is set to either the "2" or the "L" range, then the line pressure which appears at its port 43c is supplied to the upper end of the valve member 88 of the 3/OD speed shift valve 58, via the passage 48, the passage 48b, the shuttle valve 89, the passage 43l, and the port 90. Further, even if the manual shift valve 44 is not shifted to the "2" or the "L" range, the line pressure is selectively supplied to said upper end of the valve member 88 via the passages 43, 43f, 43j, via a solenoid control valve 91, and, via a passage 43k, past the shuttle valve 89 and, via the passage 43l, through the port 90. This supply, however, is controlled by the action of the solenoid valve 91.

The valve 91 comprises a solenoid 92, an armature 93, a compression coil spring 94, and a port 95 which cooperates with a valve member formed at an end of the armature 93, an inlet port 96, an outlet port 97, and a drain passage 98 which is communicated with the port 95. When the solenoid 92 is not supplied with electrical energy, then, by the action of the compression coil spring 94, the armature 93 is moved downwards in the drawing, and its lower end closes the port 95. In this condition, the line pressure supplied to the inlet port 96 via the passage 43j and via a throttling element 99 reaches the shuttle valve 89 via the outlet port 97 and the passage 43k, and thence via a passage 43l is supplied to the port 90 of the 3/OD speed shift valve 58. On the other hand, if the solenoid 92 is supplied with electrical energy, it attracts the armature 93 upwards in the drawing against the action of the compression coil spring 94, and thereby the port 95 is opened so that the line pressure, supplied as explained above to the inlet port 96 via the passage 43j and the throttling element 99, is released from the port 95 to the drain passage 98, and thus does not effectively reach the outlet port 97 or the passage 43k, and accordingly is not supplied to the port 90 of the valve 58, and does not impel the valve member 88 thereof downwards in the figure.

Energizing electrical energy is selectively supplied to the solenoid 92 of the solenoid control valve 91 by the electrical computing control system 101, via a driver actuated manual control switch 100 which can interrupt its action. The control system 101 is arranged to produce an output signal for said energization of said solenoid 92, according to the electrical signals produced by a vehicle road speed sensor 102 which responds to the road speed of the vehicle, and an intake throttle opening amount sensor 103 which responds to the amount of opening of the intake throttle of the vehicle.

In the shown embodiment, the throttle sensor 103, which generates an electric signal according to the amount of opening of the intake throttle of the engine of the vehicle, is actually a hydraulic fluid pressure switch 104, which detects the detent pressure which, as explained above, appears in the passage 53 from the throttle pressure control valve 45, when the accelerator pedal of the vehicle is depressed by more than a certain predetermined amount. However, in another embodiment, this throttle sensor 103 could be constructed as a switch which directly detects the opening amount of the intake throttle valve of the engine.

The general concept of the operation of a transmission control system such as is shown in FIG. 2 is per se well known to those skilled in the art, except for the special functions provided by the electrical control system which cooperates with the 3/OD speed shift valve 58, which is, in the shown embodiment, the highest speed transmission valve incorporated, and except for the cooperation of the solenoid control valve 91. The following explanation is an outline of the operation of the hydraulic fluid pressure control circuit which is the basis of the above described transmission control system, in order that the present invention may be more clearly understood in the context thereof.

"D" Range

When the manual shift valve 44 is set to "D" range, then the line pressure is supplied to the port 43b thereof, and therefrom, via the passage 47, is supplied to the clutch 24. If the vehicle is stationary, or moving at very low speed, then the governor pressure Pgo produced by the governor pressure control valve 54 is rather low, and therefore the valve elements of the 1/2 speed shift valve 56, the 2/3 speed shift valve 57, and the 3/OD speed shift valve 58 are all of them in their downwardly biased positions, indicated in the drawing by 56A, 57A, and 58A respectively, and thereby the line pressure supplied through the passages 47, 47a, and 47b is shut off at the port 78 of the 1/2 speed shift valve 56, and accordingly is not supplied either to the clutch 25 or to the brake 26. Further, the line pressure supplied to the 3/OD speed shift valve 58 via the passages 43, 43f, 43l, and the port 84 thereof, is supplied to the clutch 12 of the overdrive unit 2, via the port 85 and the passage 43g. Therefore, in this condition, the overdrive unit 2 is in its locked or direct drive state, so that the gear transmission mechanism 3 is in its first speed condition and no overdrive gearing is provided by the overdrive unit 2.

As the vehicle road speed gradually increases from the state outlined above, the governor pressure Pgo increases gradually in accordance therewith, and, when at a certain predetermined vehicle road speed the valve member 60 of the 1/2 speed shift valve 56 moves upwards in the drawing, under the influence of the governor pressure Pgo which is supplied to the port 63 of the valve 56 via the passage 55a, so that it is in its upwardly biased position as indicated by 56B, then the line pressure transmitted via the passage 47a, the passage 47b, and the port 78 is transmitted to the port 79, and thence via the passage 47c is transmitted to the port 80 of the 2/3 speed shift valve 57, from which, because the valve member 68 of the valve 57 is still in its downwardly biased position as indicated by 57A in the drawing, this pressure is transmitted to the port 81, whence via the passage 47d it is transmitted to the brake 26 of the gear transmission mechanism 3, thereby engaging the brake 26. In this condition, the gear transmission mechanism 3 is shifted into its second speed condition.

If now the road speed of the vehicle further increases from the condition outlined above, then the valve member 68 of the 2/3 speed shift valve 57 moves upwards to its upwardly biased position shown in the drawings by 57B, and thereby the above described hydraulic fluid pressure which is being supplied to the port 80 of the 2/3 speed shift valve 57 is now transmitted to the port 82, instead of to the port 81, and accordingly is transmitted through the passage 47e and past the shuttle valve 47f to the clutch 25 of the gear transmission mechanism 3, thereby engaging the clutch 25, while, on the other hand, the hydraulic fluid pressure which had previously been acting on the brake 26 is now released to a drain port 81a via the passage 47d and the port 81 of the 2/3 speed shift valve 57, thus releasing the engagement of the brake 26. Thus, the gear transmission mechanism 3 is shifted into its third speed condition, i.e., its direct drive condition.

If the vehicle road speed now further increases from the condition outlined above, provided that the 3/OD speed shift valve 58 is not supplied with any hydraulic fluid pressure at its port 90, then the valve member 74 will at a certain road speed shift from its downwardly biased position indicated in the drawings by 58A to its upwardly biased position indicated in the drawings by 58B, under the influence of the governor pressure supplied to the port 75, via the passage 55c, and accordingly the line pressure, which is being supplied to the port 84 of the 3/OD speed shift valve 58 via the passage 43f and the passage 43l, will now be supplied, via the port 86, and the passage 43h, to the brake 19 of the overdrive unit 2, and supply thereof via the port 85 and the passage 43g to the clutch 12 of the overdrive unit 2 will be discontinued. The hydraulic fluid pressure which was earlier acting on the clutch 12 will now be drained to the drain port 85a via the passage 43g and the port 85 of the 3/OD speed shift valve 58, thereby disengaging the clutch 12. Accordingly, the overdrive unit 2 is actuated to provide overdrive gearing ratio, whereby the automatic transmission is put into overdrive ratio or fourth speed.

In the above explanation, it has been tacitly assumed that the governor pressure has steadily increased due to increase in road speed of the vehicle, and no variation of the operation of the hydraulic fluid pressure control device due to varying of the amount of depression of the accelerator pedal of the vehicle has been considered. However, in fact, the switching points of the various valves, such as the 1/2 speed shift valve 56, the 2/3 speed shift valve 57, and the 3/OD speed shift valve 58, also depend upon the throttle pressure Pth, which varies according to the amount of depression of the throttle pedal of the vehicle, since the movements of these various valve elements occur in dependence upon the condition of balance between the governor pressure and the throttle pressure, which act in opposition to one another on the valve elements of these various shift valves, as explained hereinabove. Therefore, since this throttle pressure is in opposition to the governor pressure, if both of them increase by the same amount, speed changing will not occur. This is in accordance with the requirements for shifting of the automatic transmission.

It will also be readily understood by one skilled in the art that if starting from a high vehicle road speed the vehicle road speed gradually decreases, then, in order, the valve elements of the 3/OD speed shift valve 58, the 2/3 speed shift valve 57, and then the 1/2 speed shift valve 56 will be switched from their positions 58B to 58A, then 57B to 57A, and then 56B to 56A, respectively, thereby producing the desired shifting action between the various speed stages of the automatic transmission, in a per se well known manner.

"2" Range

When the manual shift valve 44 is shifted to the "2" range, then the line pressure will appear at its port 43c in addition to appearing at its port 43b, and therefore this line pressure will further be supplied, via the passage 48 and the passage 48a, to the port 72 of the 2/3 speed shift valve 57, and via the passage 48b, the shuttle valve 89, and the passage 43l, to the port 90 of the 3/OD speed shift valve 58. Thus, the valve member 69 of the 2/3 speed shift valve 57 and also the valve member 88 of the 3/OD speed shift valve 58 will be forced downwards in the figure, thereby forcibly retaining the valve member 68 of the 2/3 speed shift valve 57 and the valve member 74 of the 3/OD speed shift valve 58 in their downward positions, indicated respectively by 57A and 58A. Therefore, in such a condition, the overdrive unit 2 is forcibly retained in its locked or direct drive state wherein it provides no overdrive gearing ratio, and, further, the 2/3 speed shift valve 57 is inhibited from providing third or direct connection speed stage for the automatic transmission, whereby the automatic transmission as a whole operates only in the first speed or the second speed thereof, by the action of the 1/2 speed shift valve 56, as described above, which is unaffected.

"L" Range

When the manual shift valve 44 is set to the "L" range, then the line pressure also appears at its port 43d, and, via the passage 49 and the low modulator valve 66, is supplied to the port 64 and the port 65 of the 1/2 speed shift valve 56, thereby forcing the valve member 61 of the 1/2 speed shift valve 56 to its downwardly biased position indicated in the drawing by 56A, and thereby forcibly retaining the automatic transmission in its first gear stage.

The following explanation is a functional description of the operation of the electric computing control system 101, the road speed sensor 102, and the throttle opening sensor 103. The control system 101, in this embodiment, electrically controls the 3/OD speed shift valve 58, i.e. the highest speed stage shift valve, which controls the transmission to provide, in this case, the overdrive speed ratio.

Figure 3:
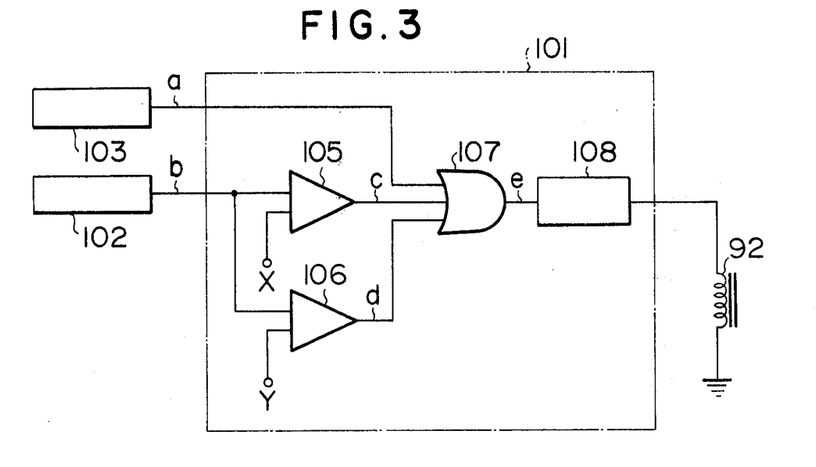
FIG. 3 is a diagram showing the logical construction of an electric computing device contained in the automatic transmission control system shown in FIG. 2.

In FIG. 3 is shown a logical circuit diagram for the electric computing control system 101. This system 101 receives an input a from the throttle opening sensor 103, and an input b from the road speed sensor 102, these inputs being in this embodiment analog voltage levels. The road speed sensor 102 produces an analog output voltage representing the road speed of the vehicle, and, although it is not specifically so shown in the drawings, may be connected to a speedometer of the vehicle, or the like.

Further, as previously explained, the throttle opening sensor 103 in this embodiment is constructed as a simple switch which detects whether the amount of opening of the throttle valve of the engine of the vehicle exceeds, in this case, 85%, and is embodied as the hydraulic fluid pressure switch 104 explained above. Since such a throttle opening sensor 103 detects "kicking-down" of the accelerator pedal of the vehicle, it may be called a kick down switch. Therefore, in the following explanation, the expression "kick down switch 103" will be used.

The construction of the kick down switch 103 is such that its voltage output a is high when the amount of opening of the throttle is less than 85%, and, conversely, its voltage output a is low when the opening amount of the throttle is 85% or greater.

As seen in FIG. 3, the output b of the road speed sensor 102 is supplied to a first comparator 105 and to a second comparator 106. The first comparator 105 is also supplied with a high speed standard voltage X, and the second comparator 106 is also supplied with a low speed standard voltage Y. The production and behavior of this high speed standard voltage X and of this low speed standard voltage Y will be explained later. The output c of the first comparator 105 is low when b is less than or equal to X, and is high when b is greater than X. Further, the output d of the second comparator 106 is low when b is greater than or equal to Y, and is high when b is less than Y.

The output c of the first comparator 105, the output d of the second comparator 106, and the output a of the kick down switch 103, are all fed into an OR circuit 107, whose output e is low only when all of its inputs a, c and d are low, and is high in all other input conditions. This output c is fed to a solenoid drive circuit 108 which produces an output which drives the solenoid 92 of the solenoid control valve 91. The operation of the solenoid drive circuit 108 is such that, when its input e is high, the solenoid 92 of the solenoid control valve 91 is supplied with electrical current and is energized, so that, as explained above, no substantial hydraulic fluid pressure is supplied to the port 90 of the 3/OD speed shift valve 58. On the other hand, when the input e of the solenoid drive circuit 108 is low, then the solenoid drive circuit 108 does not provide supply of electrical current to the solenoid 92 of the solenoid control valve 91, whereby the solenoid 92 of the solenoid control valve 91 is not energized, and whereby the port 95 is closed, thus providing, as explained above, supply of hydraulic fluid pressure to the port 90 of the 3/OD speed shift valve 58, and thus forcibly biasing the valve member 88, together with the valve members 87 and 74, downwards in the figure to their positions shown in the drawing by 58A, and thus constraining this valve 58 to provide direct connection of the overdrive unit 2. In other words, the overdrive unit 2 at this time is inhibited from providing the overdrive condition.

Therefore, as may be readily understood, when the opening amount of the throttle is below 85%, i.e. when the accelerator pedal is not kicked down, then the output a of the kick down switch 103 is high, and therefore the output e of the OR circuit 107 is high, irrespective of the values of signals c and d, whereby the solenoid drive circuit 108 supplies electrical energy to the solenoid 92 of the solenoid control valve 91 and prevents supply of hydraulic fluid pressure to the port 90 of the 3/OD speed shift valve 58, thus allowing normal operation of this valve 58, irrespective of the vehicle speed. Thus, when the accelerator pedal is not kicked down, the electrical computing control system for the automatic transmission is substantially inactive.

The high speed standard voltage X and the low speed standard voltage Y are varied according to both the opening amount of the intake throttle and the road speed of the vehicle; and, further, the values of the high speed standard voltage X and the low speed standard voltage Y may also depend not only on the current road speed of the vehicle, but on the previous history of changes in the road speed of the vehicle, in order to incorporate a hysteresis effect in operation.

Figure 4:
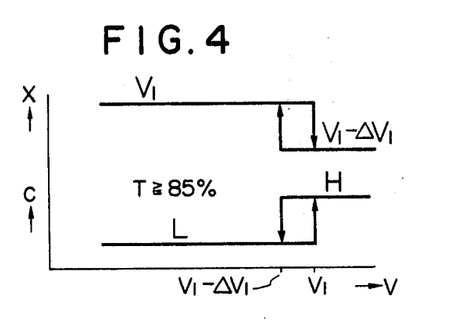
FIG. 4 is a graph showing the behavior of a high speed standard voltage X with respect to vehicle road speed, and the associated behavior of the output c of a comparator, when the road speed of the vehicle alters, while the opening amount of the intake throttle is maintained above a critical amount, in this case, 85%.
Figure 5:
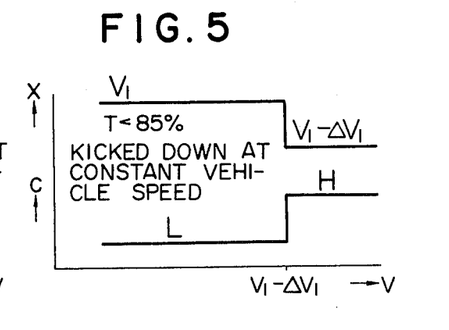
FIG. 5 is a graph showing the behavior of this high speed standard voltage X and of the output c of this comparator, according to the vehicle road speed, when at a substantially constant road speed the intake throttle of the vehicle is opened from below said critical amount to above said critical amount, in other words, when the accelerator pedal of the vehicle is "kicked down"

FIG. 4 and FIG. 5 illustrate the performance of the electric computing control system 101 in providing the high speed standard voltage X. In detail, if the opening amount of the intake throttle is greater than or equal to 85%, then the high speed standard voltage X assumes a value as shown by the upper line in FIG. 4; i.e., above a vehicle road speed V1, this high speed standard voltage X is equal to (V1−dV1); below a vehicle road speed (V1−dV1), this high speed standard voltage X is equal to V1; and, between the vehicle road speeds (V1−dV1) and V1, the high speed standard voltage X assumes either the value V1 or the value (V1−dV1), depending upon the previous history of the road speed of the vehicle. This is to incorporate a hysteresis effect in the switching operation of the transmission.

In this connection, for the convenience of description, it is assumed that the signal b has the value of the road speed of the vehicle, so that, when the road speed is V1, the value of c is V1. In accordance with this, the output c of the first comparator 105 varies as indicated by the lower line in FIG. 4 between the low level and the high level, again with a hysteresis effect similar to the hysteresis effect for the high speed standard voltage X explained above.

If, on the other hand, starting from the condition that the amount of opening of the throttle is less than 85%, at a substantially constant vehicle speed, the accelerator pedal is kicked down, then the high speed standard voltage X is determined according to the upper line in FIG. 5. In this case, the high speed standard voltage X is equal to V1 when the road speed of the vehicle is less than (V1−dV1), and is equal to (V1−dV1) when the road speed of the vehicle is higher than the value (V1−dV1). Similarly, according to this, the output c of the first comparator 105 follows the performance shown by the lower line in FIG. 5, i.e., assumes its low level when the road speed V of the vehicle is less than (V1−dV1), and assumes its high level when the road speed V of the vehicle is greater than the value (V1−dV1).

Figure 6:
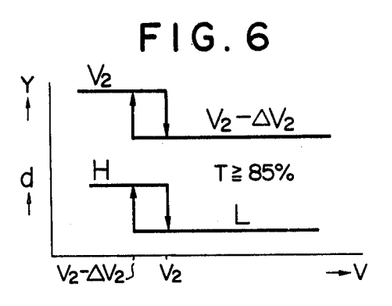
FIG. 6 is a graph showing, analogously to FIG. 4, the behavior of a low speed standard voltage Y and of the output d of another comparator, in relation to vehicle road speed, when vehicle road speed alters, while the opening amount of the intake throttle is maintained above said critical amount.
Figure 7:
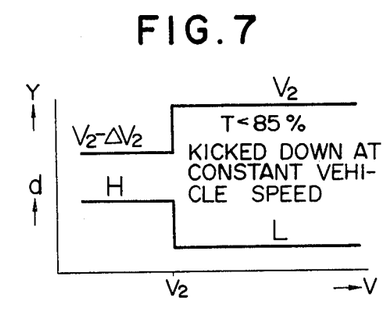
FIG. 7 is a graph showing, in a manner analogous to FIG. 5, the behavior of this low speed standard voltage Y and of the output of this comparator, in relation to vehicle road speed, when at a substantially constant vehicle road speed the accelerator pedal of the vehicle is "kicked down"

Similarly, FIG. 6 and FIG. 7 illustrate the performance of the electric computing control system 101 in providing the low speed standard voltage Y. In detail, if the opening amount of the throttle is greater than or equal to 85%, then the low speed standard voltage Y assumes a value as shown by the upper line in FIG. 6; i.e., above a vehicle road speed V2, this low speed standard voltage Y is equal to (V2−dV2); below a vehicle road speed (V2−dV2), this low speed standard voltage Y is equal to V2; and, between the vehicle road speeds (V2−dV2) and V2, the low speed standard voltage Y assumes either the value (V2−dV2) or V2, depending upon the previous history of the road speed of the vehicle, i.e. whether it was last less than V2, or greater than (V2−dV2). This is also to incorporate a hysteresis effect in the switching operation of the transmission.

In accordance with this, the output d of the second comparator 106 varies as indicated by the lower line in FIG. 6 between the low level and the high level, again with a hysteresis effect similar to the hysteresis effect for the low speed standard voltage Y explained above.

If, on the other hand, starting from the condition that the amount of opening of the throttle is less than 85%, at a substantially constant vehicle speed, the accelerator pedal is kicked down, then the low speed standard voltage Y is determined according to the upper line in FIG. 7. In this case, the low speed standard voltage Y is equal to V2 when the road speed of the vehicle is higher than V2, and is equal to (V2−dV2) when the road speed of the vehicle is less than V2. Similarly, according to this, the output d of the second comparator 106 follows the performance shown by the lower line in FIG. 7, i.e., assumes its low level when the road speed V of the vehicle is greater than V2, and assumes its high level when the road speed V of the vehicle is less than V2.

As an example, conveniently, these four critical speeds (V2−dV2), V2, (V1−dV1), and V1 may be 45 kph, 65 kph, 155 kph, and 165 kph.

Figure 8:
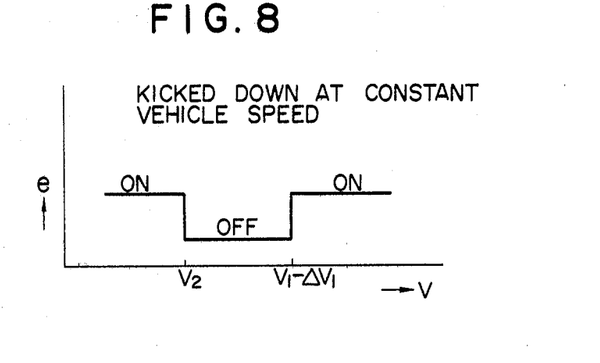
FIG. 8 is a graph showing the behavior of the output e of an OR circuit shown in FIG. 3, in relation to vehicle road speed, when at a substantially constant vehicle road speed the accelerator pedal of the vehicle is "kicked down"

By combining the graphs of FIGS. 4, 5, 6, and 7, it may be seen that if, from a condition of the automatic transmission in which the accelerator pedal of the vehicle is not kicked down, subsequently the accelerator pedal of the vehicle is kicked down, without the road speed of the vehicle substantially altering, then, the condition of the solenoid 92 (which of course was energized before the kick down) becomes as indicated by the graph of FIG. 8, depending on the said substantially constant vehicle speed when the kick down is performed. That is to say, to be specific, when the vehicle road speed before the kick down is greater than (V1−dV1), or when the vehicle speed before the kick down is smaller than V2, then the solenoid remains in energized condition after the kick down, while, on the other hand, if the vehicle speed before the kick down is between V2 and (V1−dV1), the solenoid 92 is changed into de-energized condition as a result of the kicking down of the accelerator pedal of the vehicle.

Figure 9:
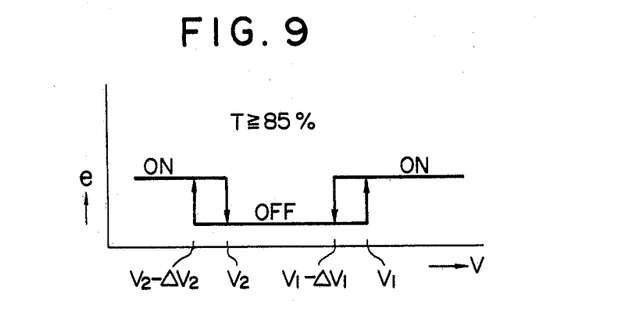
FIG. 9 shows, similarly, the behavior of this OR circuit output e, in relation to vehicle road speed, when the vehicle road speed alters while the opening amount of the vehicle intake throttle is maintained above said critical amount, i.e. 85%.

Further, when the throttle opening amount remains greater than or equal to 85%, then the solenoid 92 is switched between the energized and the de-energized states with a certain hysteresis behaviour, as the vehicle speed varies, as shown in particular by the graph in FIG. 9.

Figure 10:
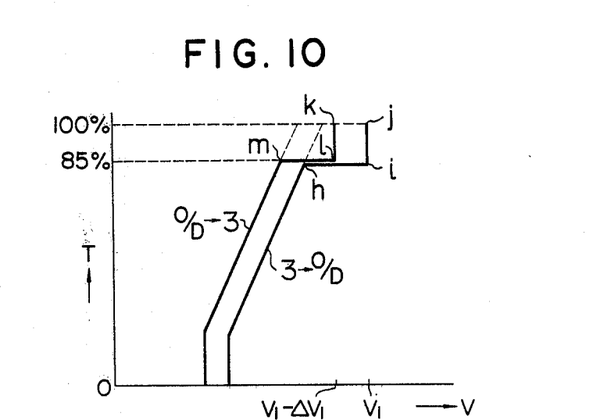
FIG. 10 is a graph showing a part of the shift diagram of the automatic transmission shown in FIG. 1, as controlled by the control means shown in FIGS. 2 and 3, particularly the manner of modification effected thereto by the electrical override control system.

FIG. 10 is a graph showing the shifting performance between the third speed or direct connection stage and the overdrive stage of the embodiment of the automatic transmission described above. In the graph of FIG. 10, throttle percentage opening T is the ordinate, and vehicle road speed V is the abscissa. The left hand slanting line in FIG. 10 is the boundary for change between overdrive and third speed, as the vehicle speed decreases, and the right hand line in FIG. 10 is the boundary for change between third speed to overdrive, as the vehicle speed increases. Thus, the area between these slanting lines is the per se conventional hysteresis area. Below 85% throttle opening, as explained above, the operation of the automatic transmission according to the present invention is substantially the same as that of a conventional transmission. However, above 85% throttle opening, the solid lines m - l - k and h - i - j indicate the performance of the automatic transmission effected by the electrical computing control system of the present invention as outlined above. That is to say, the line h - i - j in FIG. 10 indicates the corrected upshifting performance from third speed to overdrive, as vehicle speed increases, performed by the electric computing control system, while the solid line m - l - k indicates the corrected downshift performance from overdrive to third speed, as vehicle speed decreases, performed by the electric computing control system.

It will be understood by one skilled in the art, based upon the foregoing disclosure, that this correction is ideal for providing satisfactory operation of the automatic transmission in its high speed high throttle opening operational area. Further, it will be understood that, by providing some hysteresis in the operation of the solenoid 92 in this high speed high throttle opening area, frequent switching or hunting between the direct connection third speed and the overdrive speed, because of slight changes of vehicle road speed which may occur, for example, when the vehicle is being operated in hilly country, are positively prevented. Further, because the limit of vehicle road speed below which downshifting from overdrive speed can occur when accelerator pedal kick down is performed in the higher speed area is set to be lower than the upshift limit to overdrive when the road speed of the vehicle has been increased, after a downshift at a low speed, jerking and rough operation due to transmission impact caused by an abrupt shift down in the higher speed area of vehicle operation may be effectively avoided.

Furthermore, according to the above described electrical computing control system, the solenoid 92 is positively kept in the energized condition, when the vehicle road speed is sufficiently low, i.e., is below (V2−dV2), and in this condition shifting of the automatic transmission is performed only by the hydraulic fluid pressure control system. This is in order to prevent the solenoid 92 from being too frequently switched between the energized condition and the de-energized condition, every time kicking down occurs at the lower speed ranges, as during slow moving road traffic conditions, for example. Thereby, the durability of the control valve 91 is increased to a great extent. Further, due to the provision of the hysteresis effect shown in FIG. 9 between the road speeds (V2−dV2) and V2, the energizing and de-energizing action of the solenoid 92 in these lower speed ranges is not subject to undesirable hunting when the vehicle road speed varies in this range. This, again, acts to increase reliability of the solenoid. Furthermore, since it is positively arranged that the solenoid 92 is controlled to be in its energized condition at low speed ranges, it is ensured that, if the vehicle speed signal b from the road speed sensor 102 is not available due to some system failure, such as a break in a speedometer cable, or a failure in the road speed sensor 102, then, when kick down is performed while the vehicle is operating in a high speed range greater than V1, shifting down to the transmission will be effectively inhibited, and thus shift shock and impact from undesirable shifting down at high speeds will be effectively prevented, even in the event of such a malfunction.

Now, referring to FIGS. 11 and 12, a specific embodiment of the electric computing control system 101 will be described in detail.

Figure 11:
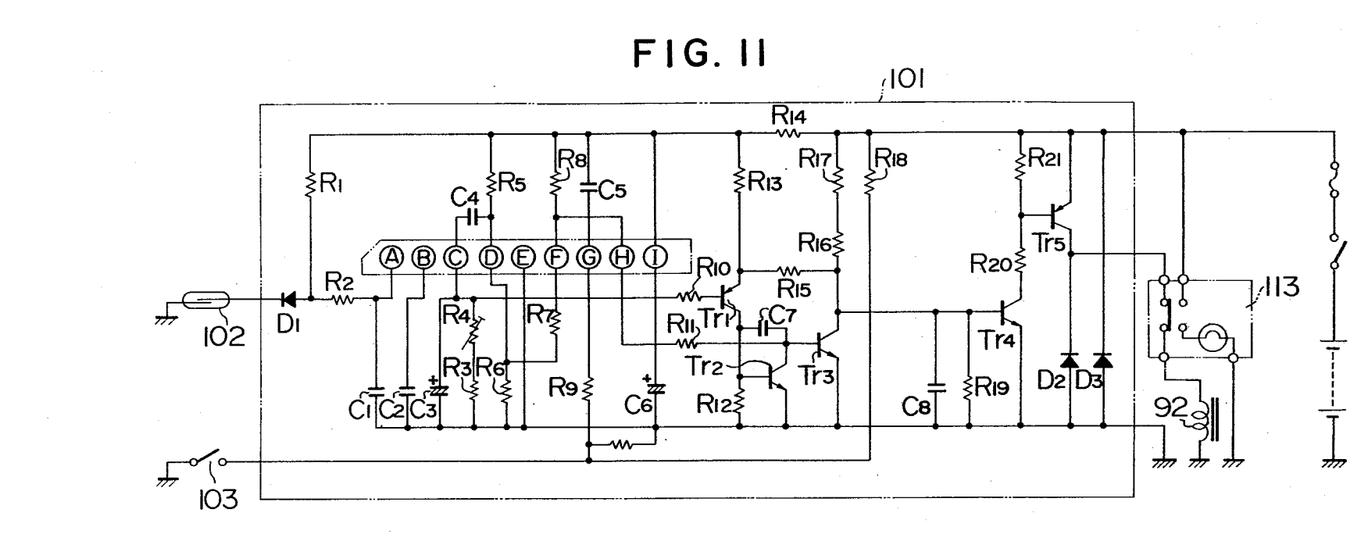
FIG. 11 is an electrical circuit diagram showing a preferred embodiment for the electrical computing device shown in FIG. 3, according to the present invention.
Figure 12:
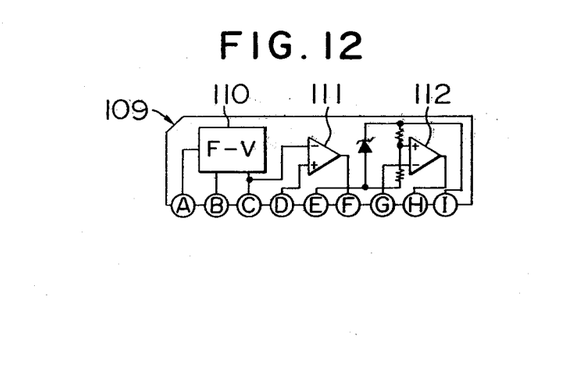
FIG. 12 is an electrical circuit diagram showing the essential portions of an IC which is used in the electric computing device shown in FIG. 11.

FIG. 11 is an electrical control circuit corresponding to the block diagram shown in FIG. 3, which is designed to include an IC (integrated circuit) 109 connected thereto with plug terminals A-I, and FIG. 12 is a schematic diagram of such an integrated circuit, adapted to be used in connection with the circuit of FIG. 11. The terminals A-I in FIG. 22 correspond to the terminals A-I, respectively, in FIG. 12.

In this embodiment, the road speed sensor 102 is formed as a reed switch which is intermittently opened and closed by some rotating member whose rotational speed is proportional to the road speed of the vehicle. Thus, the frequency of the opening and closing of the road speed sensor 102 is an indication of the road speed of the vehicle. This pulse signal is fed to the terminal A of the IC 109 and is converted into a voltage signal proportional to the road speed of the vehicle, by the F-V converting circuit 110 incorporated in the IC, and is output at the terminal C of the IC 109. The resistors R3 and R4, connected to the terminal C of the IC 109, are adjustment resistors for producing required adjustments for the voltage. The voltage at the terminal C of the IC 109 is internally connected to the comparator 111, and is compared with the high speed standard voltage X, which appears at the terminal D of the IC 109, after being divided by the resistors R5, R6, and R7, and, when the voltage is greater than X, the output at the terminal F of the IC 109 is low. Further, in the IC 109, there is incorporated a comparator 112 whose input terminal G is connected with the kick down switch 103. When a kick down is made, the kick down switch 103 becomes conducting or turned on, and the output of the comparator 112 becomes high. Because the output stages of the comparators 111 and 112 are of the open collector type, and because the IC terminals F and G are mutually connected, unless the outputs of both the comparators 111 and 112 are high, they produce a low signal. Further, the terminal I of the IC 109 is a power supply terminal, and the terminal E is a grounding terminal.

The transistors TR1 and TR2 constitute a comparator for the low speed electrical control. When the voltage of the road speed signal at the terminal C of the IC 109 is less than the low speed standard voltage Y, then the collector of the transistor TR1 and the base of the transistor TR2 are at high signal voltage, and the base of the transistor TR3 is at low signal voltage. When the road speed signal is at a voltage greater than the low speed standard voltage Y, and when the output at the terminal H of the IC is high voltage, then the base of the transistor TR3 is in high voltage; and, on the other hand, when the output at the terminal H of the IC 109 is low, then the base of the transistor TR3 is in low voltage. When the base of the transistor TR3 is in low voltage, then the base of the transistor TR4 is in high voltage, while the base of the transistor TR5 is in low voltage. When the base of the transistor TR5 is in low voltage, and when the overdrive main switch 113 is in ON, then the solenoid 92 is in an energized condition. Further, the diodes D1 and D2 are provided in order to absorb surges of voltage.

When the kick down switch 103 is in OFF condition, i.e., when kicking down of the accelerator pedal of the vehicle is not being performed, then the output of the comparator 112 is in low voltage, while the base of the transistor TR3 is in low voltage, irrespective of the voltage conditions of the comparator 111 and the transistors TR1 and TR2, and thus the solenoid electromagnet 92 is maintained in the energized condition. At this time, the high speed standard voltage X corresponds to (V1−dV1), while the lower speed standard voltage Y corresponds to V2.

When the kick down switch 103 is switched from OFF to ON by performing kicking down of the accelerator pedal of the vehicle at a substantially constant vehicle road speed, (corresponding to FIGS. 5, 7 and 8), then the following events occur. If the road speed voltage is less V2, then the terminal H of the IC 109 is in high voltage, but, since the base of the transistor TR2 is in high voltage, therefore the base of the transistor TR3 is in low voltage, and, accordingly, the solenoid 92 remains in the energized condition. At this time, since the signal voltage at terminal H of the IC 109 is high, the high speed standard voltage X increases until it becomes V1, via the resistor R7. If, on the other hand, the road speed voltage is greater than V2, but is smaller than (V1−dV1), since the terminal H of the IC 109 is high, and the base of the transistor TR2 is low, thereby the base of the transistor TR3 is high, and the solenoid 92 is put into the de-energized condition. At this time, since the collector of the transistor TR3 is to low, and the emitter of the transistor TR1 is low, the low speed standard voltage Y corresponds to (V2−dV2).

Furthermore, if the road speed voltage is greater than (V1−dV1), since the terminal H of the IC 109 is low, the base of the transistor TR3 is low, and accordingly the solenoid 92 remains in the energized condition.

On the other hand, if the vehicle road speed varies while the accelerator pedal is kept in the kicked down condition (corresponding to the graphs in FIGS. 4, 6 and 9), then the following things happen. If kick down is done when the road speed voltage V is smaller than V2, then the solenoid 92 remains in the energized condition, and the high speed standard voltage X is V1. When the road speed of the vehicle increases from such a condition so much that V becomes larger than V2 but smaller than V1, then the base of the transistor TR2 changes to be low, and the base of the transistor TR3 changes to be high, and thereby the solenoid 92 becomes de-energized. At this time, the low speed standard voltage Y becomes to be (V2−dV2).

When the road speed V of the vehicle is further increased until V becomes greater than V1, then the terminal H of the IC 109 changes to low, and the base of the transistor TR3 changes to high, so that the solenoid 92 returns to the ON condition, and the high speed standard voltage X becomes to be (V1−dV1).

Now, if the road speed V of the vehicle is reduced from a road speed greater than V1, with the accelerator pedal kept in the kick down condition, then, since the high speed standard voltage X is at this time (V1−dV1), the solenoid 92 remains in the energized condition as long as V is greater than (V1−dV1), but, when the road speed V of the vehicle drops so that is is less than (V1−dV1), but is still greater than (V2−dV1), then the state of the solenoid 92 is altered so that it is now in the de-energized condition, and at this time the high speed standard voltage X is altered to V1. As the road speed of the vehicle further decreases, the solenoid 92 remains in the de-energized condition until V becomes less than (V2−dV2). When, however, V becomes less than (V2−dV2), then the solenoid 92 is altered to the energized condition, and further the low speed standard voltage Y is altered to V2.

Thus, it will be understood by one skilled in the art that, with such a construction, an energizing and de-energizing action of the solenoid 92 of the control valve 91, as shown in FIGS. 8 and 9, is obtained.

The present invention has been described with respect to a particular embodiment as shown in the construction of the various hydraulic circuits, and also as shown with respect to the particular construction of the electrical circuits of FIGS. 11 and 12. However, it should not be considered as limited to any particular details of the shown embodiment. The high speed standard voltage X and the low speed voltage Y could be produced in alternative ways, using other electric circuits, or using a digital computer, and the operation of the electric calculating control system 101 could be performed in a way different from the way shown with reference to the block diagram of FIG. 3. Therefore, the concept of the present invention, and the scope thereof, are not to be considered as limited to any of the particular details of the shown embodiment, or of any of the drawings, but are to be defined only by the scope of the appended claims, which follow.

We claim:

1. For an automatic transmission, for a vehicle including an engine, a gear transmission mechanism having several speed stages, a plurality of hydraulic fluid pressure actuated friction engagement devices, which according to selective engagement of said friction engagement devices selectively provides one or another of several speed stages, an automatic transmission control system, comprising:
   (a) a source of pressurized hydraulic fluid;
   (b) a line hydraulic fluid pressure control valve which regulates said pressurized hydraulic fluid to produce a controlled line pressure;
   (c) a throttle hydraulic fluid pressure control valve which regulates said line pressure to produce a throttle pressure having a pressure value corresponding to vehicle engine load;
   (d) a governor hydraulic fluid pressure control valve which regulates said line pressure to produce a governor pressure having a pressure value corresponding to vehicle road speed;
   (e) a plurality of speed shift valves which selectively supply actuating hydraulic fluid pressures to said hydraulic fluid pressure actuated friction engagement devices, according to the current values of said throttle pressure and said governor pressure which act in opposition on each of said speed shift valves;
   (f) a vehicle speed sensor which generates an electrical signal related to vehicle road speed;
   (g) a throttle sensor which generates an electrical signal related to vehicle engine load;
   (h) an electrically operated override valve which selectively outputs an override pressure, said override pressure being supplied to one of said speed shift valves so as partly to modify the performance thereof; and
   (i) an electrical computing device which supplies said electrical signal to said electrically operated override valve according to the electric signals produced by said vehicle speed sensor and said throttle sensor.

2. An automatic transmission control device according to claim 1, wherein the one of the transmission valves which is selectively supplied with the override pressure is for switching between the highest and the next to the highest speed stages provided by the gear transmission mechanism, and the override pressure, when supplied, forces this shift valve not to provide the highest speed stage.

3. An automatic transmission control system according to claim 2, wherein the electrical computing device controls the override valve:
   (i1) not to provide said override pressure when the engine load is below a certain predetermined critical engine load value, irrespective of the value of vehicle speed;
   (i2) when the vehicle speed is within a certain range below a first predetermined vehicle speed value, and the engine load is then increased from below said critical engine load value to above said critical engine load value, the vehicle speed meanwhile remaining substantially constant, to commence supply of said override pressure;
   (i3) when the vehicle speed is above said first predetermined vehicle speed value, and the engine load is then increased from below said critical engine load value to above said critical engine load value, the vehicle speed meanwhile remaining substantially constant, not to commence supply of said override pressure;
   (i4) when, while the engine load remains above said critical engine load amount and said override pressure is being provided, the vehicle speed increases, to stop supply of said override pressure when the vehicle speed passes from below a second predetermined vehicle speed value, which is somewhat higher than said first predetermined vehicle speed value, to above said second predetermined vehicle speed value; and
   (i5) when, while the engine load remains above said critical engine load value and said override pressure is not being provided, the vehicle speed decreases, to commence supply of said override pressure when the vehicle speed passes from above said first predetermined vehicle speed value to below said first predetermined vehicle speed value.

4. An automatic transmission control system according to claim 3, wherein said electrical computing device further supplies said electrical signal to said electrically operated override valve, so as:

(j1) when the vehicle speed is below a third predetermined vehicle speed value substantially less than said first predetermined vehicle speed value and the value of engine load is then increased from below said critical engine load value to above said critical engine load value, the vehicle speed meanwhile remaining substantially constant, not to commence supply of said override pressure;

(j2) when, while the value of engine load remains above said critical engine load value and supply of said override pressure is not being provided, the vehicle speed increases, to commence supply of said override pressure when the vehicle speed passes from below said third predetermined vehicle speed value to above said third predetermined vehicle speed value; and (j3) when, while the value of engine load remains above said critical engine load value and supply of said override pressure is being provided, the vehicle speed decreases, to stop supply of said override pressure when the vehicle speed passes from above a fourth predetermined vehicle speed value which is somewhat lower than said third predetermined vehicle speed value to below said fourth predetermined vehicle speed value.

5. A transmission control system according to claim 2, wherein said electrical computing device controls said override valve to provide said override pressure when and only when:

(k1) the value of engine load is above a predetermined critical engine load value; and (k2) the signal from said vehicle speed sensor indicates a current vehicle speed between the speed corresponding to a low critical speed signal and the speed corresponding to a high critical speed signal; and wherein said high critical speed signal:

(l1) when at a substantially constant vehicle speed the value of engine load is increased from below said critical engine load value to above said critical engine load value, is set to correspond to a first predetermined vehicle speed value if the vehicle speed is higher than this first predetermined vehicle speed value, and is set to correspond to a second predetermined vehicle speed value which is somewhat higher than said first predetermined vehicle speed value if the vehicle speed is lower than this first predetermined vehicle speed value;

(l2) when, while the value of engine load remains above said critical engine load value and the value of said high critical speed signal corresponds to said second predetermined vehicle speed value, the vehicle speed increases, is set to correspond to said first predetermined speed value, when the vehicle speed passes from below said second predetermined vehicle speed value to above said second predetermined vehicle speed value; and (l3) when, while the value of engine load remains above said critical engine load value and the value of said high critical speed signal corresponds to said first predetermined vehicle speed value, the vehicle speed decreases, is set to correspond to said second predetermined speed value, when the vehicle speed passes from above said first predetermined vehicle speed value to below said first predetermined vehicle speed value; and wherein said low critical speed signal:

(m1) when at a substantially constant vehicle speed the value of engine load is increased from below said critical engine load value to above said critical engine load value, is set to correspond to a third predetermined vehicle speed value substantially lower than said first predetermined vehicle speed value if the vehicle speed is higher than this third predetermined vehicle speed value, and is set to correspond to a fourth predetermined vehicle speed value which is somewhat lower than said third predetermined vehicle speed value if the vehicle speed is lower than the third predetermined vehicle speed value;

(m2) when, while the value of engine load remains above said critical engine load value and the value of said low critical speed signal corresponds to said third predetermined vehicle speed value, the vehicle speed increases, is set to correspond to said fourth predetermined speed value, when the vehicle speed passes from below said third predetermined vehicle speed value to above said third predetermined vehicle speed value; and (m3) when, while the value of engine load remains above said critical engine load value and the value of said low critical speed signal corresponds to said fourth predetermined vehicle speed value, the vehicle speed decreases, is set to correspond to said third predetermined speed value, when the vehicle speed passes from above said fourth predetermined vehicle speed value to below said fourth predetermined vehicle speed value.

6. An automatic transmission control system for a vehicle having an automatic transmission, an engine, a gear transmission mechanism having several speed stages and a plurality of hydraulic fluid pressure actuated friction engagement devices, which according to selective engagement of said friction engagement devices selectively provides one or another of several speed stages comprising:

(a) a source of pressurized hydraulic fluid;

(b) a line hydraulic fluid pressure control valve for regulating said pressurized hydraulic fluid to produce a controlled line pressure;

(c) a throttle hydraulic fluid pressure control valve for regulating said line pressure to produce a throttle pressure having a pressure value corresponding to vehicle engine load;

(d) a governor hydraulic fluid pressure control valve for regulating said line pressure to produce a governor pressure having a pressure value corresponding to vehicle road speed;

(e) a plurality of speed shift valves for selectively supplying actuating hydraulic fluid pressures to said hydraulic fluid pressure actuated friction engagement devices, according to the current values of said throttle pressure and said governor pressure which act in opposition on each of said speed shift valves;

(f) a vehicle speed sensor for generating an electrical signal related to vehicle road speed;

(g) a throttle sensor for generating an electrical signal related to vehicle engine load;

(h) an electrically operated override valve for selectively outputting an override pressure, said override pressure being supplied to one of said speed shift valves for partly modifying the performance thereof; and (i) an electrical computing device for supplying said electrical signal to said electrically operated override valve according to the electric signals produced by said vehicle speed sensor and said throttle sensor;

said electrical computing device selectively controlling the supply of override pressure to a shift valve for switching between a highest and a next to the highest speed stage for forcing the shift valve to the next to the highest speed stage in response to said throttle sensor and a combination of said throttle sensor and vehicle speed.

* * * * *